No. 684,761. Patented Oct. 15, 1901.
C. F. SMITH.
TABLE FORK.
(Application filed Jan. 2, 1901.)

(No Model.)

Witnesses
B. C. Woodford.
P. J. Egan

Inventor
Charles F. Smith,
By James Shepard
Atty.

UNITED STATES PATENT OFFICE.

CHARLES F. SMITH, OF NEW BRITAIN, CONNECTICUT, ASSIGNOR TO LANDERS, FRARY, AND CLARK, OF NEW BRITAIN, CONNECTICUT.

TABLE-FORK.

SPECIFICATION forming part of Letters Patent No. 684,761, dated October 15, 1901.

Application filed January 2, 1901. Serial No. 41,834. (No model.)

*To all whom it may concern:*

Be it known that I, CHARLES F. SMITH, a citizen of the United States, residing at New Britain, in the county of Hartford and State of Connecticut, have invented certain new and useful Improvements in Table-Forks, of which the following is a specification.

My invention relates to improvements in table-forks; and the main object of my improvement is to produce a fork with a scale-handle tang or handle-web from plate metal and at a small cost.

Figure 1:
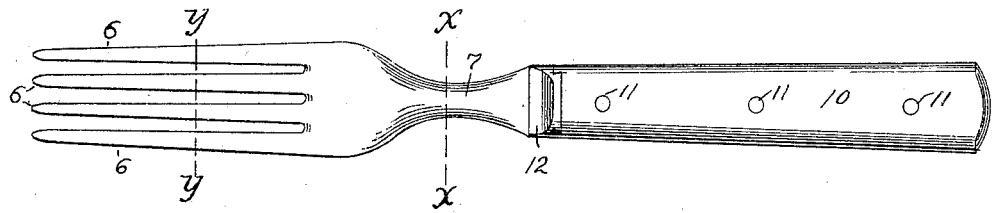
Figure 2:
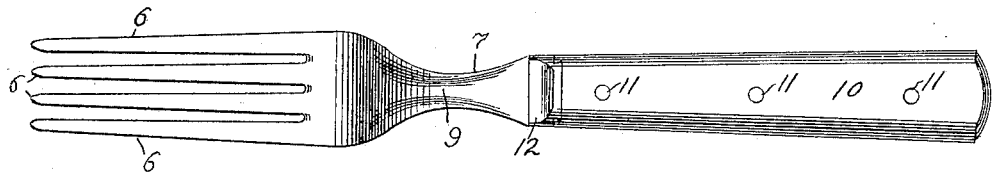
Figure 3:
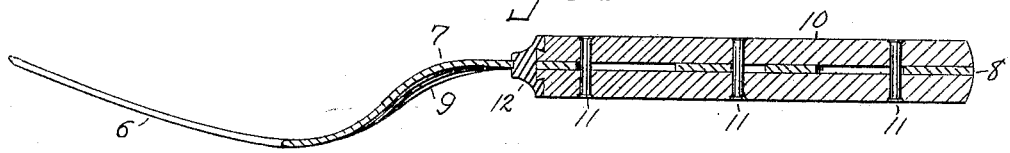
Figure 4:
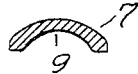
Figure 5:
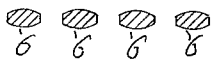

In the accompanying drawings, Figure 1 is a plan view of my fork. Fig. 2 is a reverse plan view of the same. Fig. 3 is a central longitudinal section thereof. Fig. 4 is an enlarged transverse section of the shank portion on the line *x x* of Fig. 1. Fig. 5 is a like view of the tines on the line *y y* of Fig. 1.

I form the tines 6, neck or shank 7, and handle tang or web 8 of one piece of sheet or plate metal, the same being first blanked out by cutting-dies and then struck by dies which not only bend the metal, but also shape it by compression. The neck or shank is so short and the width at each end is so great while the middle of the shank is quite narrow that the said shank widens quite abruptly in both directions from its middle portion. The top or front face of the shank is smoothly rounded over in convex form both laterally and longitudinally, and in the middle portion on the under side the shank is transversely concaved or grooved, as at 9, the said groove being smaller and of a different shape from the transverse convexity on the top surface of the shank, as best shown in Fig. 4. This concave and convex portion of the shank tapers gradually in both directions longitudinally of the shank, and one end entirely vanishes at the junction of the shank and handle-web, so that the said web is flat or straight across and is adapted to receive the ordinary handle-scale. The other end of the concave and convex portions also vanishes at the junction of the shank and tines of the fork, so that the fork is flat and straight across at the base of the tines, as shown by the edge view, Fig. 3, and the concavity does not extend into any of the tines, which tines are convex on both sides. This enables me to make a stiff and strong shank and at the same time have a plain smooth rounded top surface in contradistinction to a top surface having merely a central longitudinal ridge with a flat portion on each side thereof. In striking the shank to compress and shape the metal the tines are compressed to give them the approximately oval form shown in Fig. 5.

The tang or handle-web 8 is of the desired contour for the handle and is provided with holes for the attachment of the bolster 12 and handle-scales 10, the rivets 11, which hold the handle-scales, passing through holes or slots in the said handle-web in the ordinary manner of attaching bolsters and handle-scales to similar tangs or handle-webs.

I am aware that a prior patent shows, describes, and claims a fork consisting of two pieces of cold-rolled steel corrugated and riveted together, the said sheet-metal fork having central corrugations extending longitudinally through each of the tines and shank, and the same is hereby disclaimed.

I claim as my invention—

The herein-described fork, consisting of the tines, shank and handle-web all formed of plate metal by cutting, bending and changing the shape of the unbent portions by compression, the said shank having a convex and concave portion of different shapes in cross-section, tapering longitudinally in both directions, and vanishing entirely at the junction of the shank and base of the tines, which base is flat and straight across, and also vanishing entirely at the junction of the shank and handle-web, which web is also flat and straight across, substantially as described.

CHARLES F. SMITH.

Witnesses:
G. W. LANDERS,
LEROY H. PAGE.